Patented Nov. 14, 1944

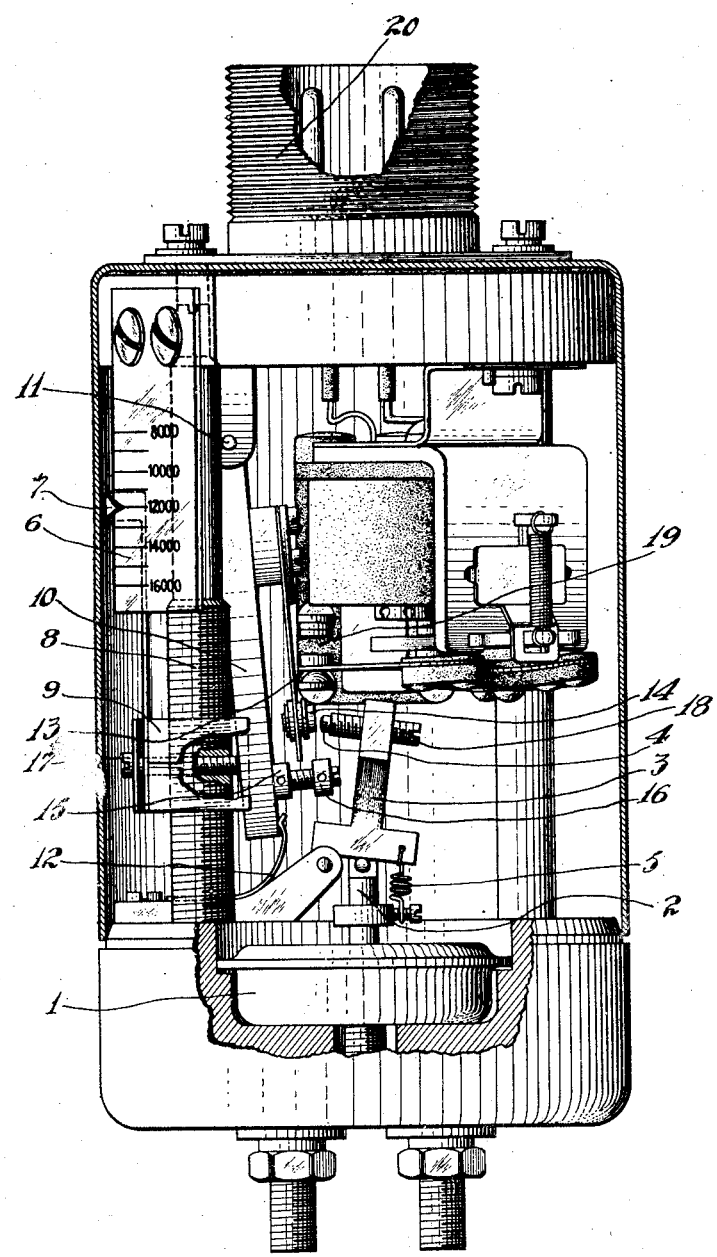

2,362,869

UNITED STATES PATENT OFFICE 2,362,869

ELECTRICAL SWITCH

Kenneth L. Wade, New York, N. Y., assignor to Baker & Co. Inc., Newark, N. J., a corporation of New Jersey Application January 20, 1944, Serial No. 519,043

5 Claims. (Cl. 200—83)

The present invention relates to pressure operated electrical switches which serve to open or close an electrical circuit at pressures corresponding to preset scale values of pressure or pressure equivalents. More particularly it relates to means of adjusting the relative position of one of the switch contacts in conformity with a range of settings on a scale in such a manner as to ensure that the switch will operate accurately in accordance with the scale readings within that range.

It is desirable for many purposes to provide an instrument which will automatically open or close an electrical circuit, whenever a predetermined condition of pressure is reached. The electrical circuit may be used to operate warning devices or auxiliary equipment either directly or through a secondary circuit actuated thereby. Such instruments might, for example, be used in aircraft, submarines, tunnels and the like, either to give warning of increases or decreases of pressure beyond predetermined limits or to maintain the pressure within predetermined limits by starting or stopping suitable pumps or other auxiliary devices. Many other applications, such as varying propeller pitch, cutting in superchargers, etc., will be obvious to those skilled in the art. The pressure actuating the switch may be that of a liquid, as well as of a gas, and might even be produced by the weight of an object. All that is required is that the pressure be translated into the gradual displacement of an object by means of some pressure sensitive device, such as an aneroid, an elastic membrane, a column of mercury, or some other similar device. In such instruments one electrical contact of the pressure operated switch is displaced by the pressure sensitive device in accordance with variations in the pressure and the other electrical contact of the switch is adjustable, so that by setting it for a predetermined pressure, for example on a scale which may bear readings either in terms of pressure or its equivalent, such as altitude, depth, etc., the two contacts will engage or disengage, as the case may be, when the predetermined condition of pressure is reached.

It has become increasingly important that such instruments can be accurately calibrated and periodically adjusted, so that they may be set for any predetermined value within the desired pressure range and dependably open or close the electrical circuit, when the value indicated on the scale or at least a close approximation thereof is reached. This would constitute no special problem, if the displacement of the electrical contact that is actuated by the pressure sensitive device always proceeded in some simple, direct proportion to the change in pressure throughout the entire range of pressures desired and if the deflection rate of all pressure sensitive devices of a particular type were always the same. However, in practice pressure sensitive devices, even when of the same type and dimensions, tend to behave somewhat differently from one another. Furthermore, differences in the performance of the instruments may be caused by even minute variations in the means employed for translating the deflection of the pressure sensitive device into displacement of one of the electrical contacts.

A conceivable solution of the problem might be to calibrate individually the setting scale of each instrument to make it conform to the actual rate of displacement of the pressure actuated contact embodied therein. However, apart from its high cost, such a procedure would not be desirable, because the deflection rate of aneroids and similar pressure sensitive devices changes with time and, furthermore, interchangeability of parts would be affected. Such interchangeability of parts, including the prefabricated setting scales themselves, is essential for economical mass production of the instruments. It is, therefore, most desirable that means are provided whereby individual calibration to fine tolerances is possible without affecting interchangeability of any of the parts and that correction of secular error in the aneroid or other pressure sensitive device may be made through the same calibration means. It is apparent that, if the deflection rate were a straight line function, a direct and accurate screw adjustment for one electrical contact would be sufficient for any setting within the range of the device. Since the deflection rate is variable, it is required that through initial calibration the rate of displacement of the electrical contact that is actuated by the setting means is made to conform to the rate of displacement of the other contact actuated by the pressure sensitive device.

It is an object of the present invention to provide setting means for instruments of the above described character, which can be accurately calibrated without changing a prefabricated setting scale. Another object is to provide means that can be easily set at desired scale values and dependably operate at actual pressures corresponding to the scale settings. Further objects will be apparent from the following description of my device.

As indicated above, my novel setting means controls the amount and character of displacement imparted to one of the switch contacts by changes in settings on the scale. In its preferred form it also embodies means for automatically compensating for the effect of changes in temperature. The displacement of the other switch contact is controlled by the pressure sensitive device. My new setting device comprises, besides a scale and movable pointer, a rotatable bar and a setting screw in close proximity and substantially parallel to each other. The axis of rotation of the bar is near one end of the setting screw and is substantially perpendicular to the axis of the screw. On the setting screw there is provided a setting nut which carries the pointer and moves it along the scale as the setting screw is turned. The setting nut at the same time through an adjusting screw mounted therein acts as a wedge between the setting screw and the rotatable bar. As the setting nut approaches the axis of rotation of the bar, it displaces the other end of the bar away from the setting screw. The rate of displacement will depend on the angle between the bar and the setting screw. The bar carries one of the electrical contacts near its free end and is acted upon by a spring that holds it against the adjusting screw that is mounted in the setting nut. Thus by turning the setting screw one simultaneously moves the pointer on the scale and the position of one of the electrical contacts.

I shall now more particularly described my pressure operated switch with reference to the accompanying drawing which illustrates an aircraft altitude warning device embodying such a switch.

The drawing shows a cut away view of such an instrument in which 1 is an aneroid to which is attached a post 2. The post acts upon a rotatable sector 3 carrying one of the switch contacts 4. The spring 5 holds the sector against the post. Any change in the pressure (altitude) will cause a corresponding displacement of the post which will be converted into a greater displacement of the contact 4. The setting scale 6 carries figures giving altitude above sea level. The pointer 7 is moved along the scale by turning the setting screw 8 as this serves to raise or lower the setting nut 9 that carries the pointer. The setting nut through the adjusting screw 17 mounted therein is in slidable contact with the rotatable bar 10 whose axis of rotation 11 is located close to the upper end of the setting screw and is perpendicular to the axis of the screw. The bar is held against the adjusting screw by means of the spring 12. The rotatable bar carries a bimetallic strip 13 which bears the second contact 14. The function of the bimetallic strip is to compensate for temperature changes as will be more fully described hereafter.

The setting of the instrument is accomplished by turning the setting screw thus moving the setting nut and the pointer till the latter is opposite the desired reading on the scale. Thereby the contact 14 assumes a position relative to the contact 4 such that the two will just engage when the pressure acting on the aneroid corresponds to the altitude reading opposite the pointer on the scale. Variations in temperature affect both the pressure at the given altitude and the actual operation of the instrument owing to the expansion or contraction of its metal parts. It is, therefore, desirable to include a temperature compensating means. This function is performed by the bi-metallic strip 13 which is composed of two layers of metals having different coefficients of expansion that are firmly held together by two screws a short distance apart from each other. Due to the different rates of expansion of the metal layers, the strip bearing the contact will bend backwards or forwards as the temperature rises or falls. By properly selecting and proportioning the strip one can thus compensate for the effects of temperature changes. Adjustable nuts 15 and 16 are provided in the path of deflection of the bi-metallic strip, so that the amount of deflection can be limited.

Calibrating means are provided, so that the instrument can be adjusted for accurate operation. The first of these is the adjusting screw 17 on the setting nut 9. It can be used to vary the angle between the rotatable bar and the setting screw. By thus varying this angle one can vary the rate of displacement of the contact 14 caused by movements of the setting nut to make it correspond with the actual displacement rate of the contact 4. The contact 4 is carried by a screw 18 which can be used to adjust the position of this contact relative to the other. Once the rate of setting displacement has been properly adjusted, one employs the screw 18 to ensure that the contacts engage when the pressure corresponds to the altitude set on the scale.

In the instrument shown the switch contacts open and close a primary circuit which in turn operates an electromagnetic switch 19 to open or close a more powerful secondary circuit that actuates the warning device itself. The latter may consist of a bell, horn or light (not shown). Both of the circuits are grounded. One lead of each circuit runs to a pin in the electrical receptacle 20. To ensure proper positioning of the electric plug to be inserted in the receptacle the latter may be provided with a polarizing key which fits into a slot in the plug only when the latter is correctly inserted. Power can be supplied to the circuits in any convenient way.

Many variations are possible without departing from my invention. The setting screw, setting nut, adjusting screws, etc., might be replaced by equivalent members or elements that are movable in the same directions. One could also improve the calibration in some cases by imparting a suitable curvature to the surface of the rotatable sine bar that is held in slidable contact with the adjusting screw.

I claim:

1. In a switch of the class described, in combination, a pressure sensitive device that is deflected by variations in pressure. means for imparting a proportionate displacement to one electrical contact of the switch, means for setting the relative position of the other electrical contact of the switch so that the two will engage to close an electrical circuit when the pressure operating the switch reaches a predetermined value, said setting means comprising a bar that is rotatively mounted at one of its ends and carries the settable contact near its other end, a setting element movable in a direction substantially parallel to the length of the bar and an adjusting member carried by said setting element, said adjusting member being in slidable contact with the bar and movable in a direction substantially perpendicular to the length of the bar, whereby the bar and settable contact are angularly displaced by movements of either the setting element or the adjusting member.

2. In a switch of the class described, in combination, a pressure sensitive device that is deflected by variations in pressure, means for imparting a proportionate displacement to one electrical contact of the switch, means for setting the relative position of the other electrical contact of the switch so that the two will engage to close an electrical circuit when the pressure operating the switch reaches a predetermined value, said setting means comprising a bar that is rotatively mounted at one of its ends and carries the settable contact near its other end, a setting nut mounted upon a setting screw that is in close proximity and substantially parallel to the bar and an adjusting screw carried by the setting nut which screw is in slidable contact with the bar and movable in a direction substantially perpendicular to the length of the bar, whereby the rotatable bar and the settable contact are angularly displaced by rotation of either the setting or the adjusting screw.

3. A switch as claimed in claim 2 in which the settable contact is attached to the rotatable bar through the medium of a thermostatic bimetallic strip whereby compensation for the effects of temperature changes is provided.

4. A switch as claimed in claim 2 in which the pressure deflected contact is carried by a second adjusting screw enabling one to adjust the distance between the two contacts.

5. A switch as claimed in claim 2 in which the setting nut also serves to move a pointer along a scale from which the predetermined pressure value can be read.

KENNETH L. WADE.